US009061766B2

(12) United States Patent
Kladde

(10) Patent No.: US 9,061,766 B2
(45) Date of Patent: Jun. 23, 2015

(54) SYNCHRONOUS SEAT RECLINE MECHANISM

(71) Applicant: Burkley U. Kladde, Chandler, AZ (US)

(72) Inventor: Burkley U. Kladde, Chandler, AZ (US)

( * ) Notice: Subject to any disclaimer, the term of this patent is extended or adjusted under 35 U.S.C. 154(b) by 42 days.

(21) Appl. No.: 13/691,119

(22) Filed: Nov. 30, 2012

(65) Prior Publication Data

US 2013/0134758 A1    May 30, 2013

Related U.S. Application Data

(60) Provisional application No. 61/565,133, filed on Nov. 30, 2011.

(51) Int. Cl.
*B64D 11/06* (2006.01)
*A47C 1/024* (2006.01)

(52) U.S. Cl.
CPC ............... *B64D 11/06* (2013.01); *A47C 1/024* (2013.01); *B64D 11/0696* (2013.01); *B64D 11/064* (2014.12); *B64D 11/0601* (2014.12)

(58) Field of Classification Search
CPC .. A47C 1/024; B64D 11/0696; B64D 11/064; A64D 11/0601
USPC .................................................. 297/341, 342
See application file for complete search history.

(56) References Cited

U.S. PATENT DOCUMENTS

| 1,399,744 | A | | 12/1921 | Brophy |
| 3,377,102 | A | | 4/1968 | Henrikson |
| 3,485,527 | A | | 12/1969 | Barghout |
| 3,581,620 | A | | 6/1971 | Hauck et al. |
| 3,833,257 | A | | 9/1974 | Dove |
| 3,883,173 | A | | 5/1975 | Shephard et al. |
| 3,910,632 | A | | 10/1975 | Marechal |
| 4,055,320 | A | | 10/1977 | Bengtsson |
| 4,452,486 | A | * | 6/1984 | Zapf et al. ................. 297/343 |
| 4,526,421 | A | | 7/1985 | Brennan et al. |
| 4,630,864 | A | | 12/1986 | Toll |
| 4,765,679 | A | | 8/1988 | Lanuzzi et al. |

(Continued)

FOREIGN PATENT DOCUMENTS

| DE | 37 37 492 A1 | 5/1989 |
| DE | 101 22 386 A1 | 11/2002 |

(Continued)

OTHER PUBLICATIONS

International Search Report mailed Sep. 28, 2010 in International Application No. PCT/US09/067107.

(Continued)

*Primary Examiner* — Sarah B McPartlin
(74) *Attorney, Agent, or Firm* — Boardman & Clark LLP

(57) ABSTRACT

A seat for use in an aircraft having a floor is provided. The seat has a support assembly, a seat, a seat back pivotably coupled to the support assembly for movement between an upright position and a reclined position relative to the support assembly, and an occupant back support having an upper portion and lower portion pivotally coupled to the seat back at the upper portion. A pivot link pivotally couples to the rear portion of the seat at a first end and pivotally couples to the lower portion of the occupant back support at a second end. The pivot link causes the lower portion of the occupant back support to move downwardly and forward relative to the seat as the seat back moves from the upright position to the reclined position.

20 Claims, 10 Drawing Sheets

(56) References Cited

U.S. PATENT DOCUMENTS

| | | | |
|---|---|---|---|
| 4,790,496 A | 12/1988 | Murrujo | |
| 4,827,679 A | 5/1989 | Earle | |
| 4,917,438 A | 4/1990 | Morgan | |
| 4,979,778 A | 12/1990 | Shields | |
| 5,143,421 A | 9/1992 | Voss et al. | |
| 5,242,138 A | 9/1993 | Kornberg | |
| 5,344,210 A | 9/1994 | Marwan et al. | |
| 5,385,388 A | 1/1995 | Faiks et al. | |
| 5,452,868 A | 9/1995 | Kanigowski | |
| 5,624,158 A | 4/1997 | Adat et al. | |
| 5,636,898 A | 6/1997 | Dixon | |
| 5,699,984 A | 12/1997 | Pinault | |
| 5,810,440 A * | 9/1998 | Unwalla | 297/316 |
| 6,217,119 B1 | 4/2001 | Cook et al. | |
| 6,237,994 B1 | 5/2001 | Bentley et al. | |
| 6,394,545 B2 | 5/2002 | Knoblock et al. | |
| 6,439,661 B1 | 8/2002 | Brauning | |
| 6,532,962 B1 | 3/2003 | Walker et al. | |
| 6,616,228 B2 | 9/2003 | Heidmann | |
| 6,644,736 B2 | 11/2003 | Nguyen et al. | |
| 6,739,669 B2 | 5/2004 | Etzioni et al. | |
| 6,742,840 B2 | 6/2004 | Bentley | |
| 6,758,523 B2 | 7/2004 | Vanderiet et al. | |
| 6,764,137 B2 | 7/2004 | Menard | |
| 6,913,315 B2 | 7/2005 | Ball et al. | |
| 6,966,604 B2 | 11/2005 | Stumpf et al. | |
| 6,991,291 B2 | 1/2006 | Knoblock | |
| 7,032,971 B2 | 4/2006 | Williams | |
| 7,083,230 B2 | 8/2006 | Kull et al. | |
| 7,097,249 B2 | 8/2006 | Igarashi et al. | |
| 7,108,325 B2 | 9/2006 | Williamson et al. | |
| 7,108,329 B1 * | 9/2006 | Clough | 297/423.19 |
| 7,131,700 B2 | 11/2006 | Knoblock et al. | |
| 7,140,684 B2 | 11/2006 | Wagner et al. | |
| 7,249,802 B2 | 7/2007 | Schmitz et al. | |
| 7,469,964 B2 | 12/2008 | Baumann | |
| 7,637,571 B2 * | 12/2009 | Okano et al. | 297/343 |
| 7,677,654 B2 | 3/2010 | Enberg et al. | |
| 7,862,123 B2 | 1/2011 | Baker et al. | |
| 7,874,618 B2 * | 1/2011 | Kohl et al. | 297/284.4 |
| 2006/0082208 A1 | 4/2006 | Beermann et al. | |
| 2006/0202541 A1 | 9/2006 | Armo et al. | |
| 2007/0024098 A1 | 2/2007 | Knoblock et al. | |
| 2007/0065248 A1 | 3/2007 | Legeay | |
| 2008/0124557 A1 | 5/2008 | Freestone | |
| 2008/0169694 A1 | 7/2008 | Speh et al. | |
| 2009/0084925 A1 | 4/2009 | Kismarton | |
| 2010/0187895 A1 | 7/2010 | Kismarton et al. | |
| 2011/0049960 A1 | 3/2011 | Ferguson et al. | |

FOREIGN PATENT DOCUMENTS

| | | |
|---|---|---|
| DE | 101 35 857 C1 | 11/2002 |
| EP | 1947007 A1 | 7/2008 |
| FR | 2 433 433 A1 | 3/1980 |
| WO | WO 02/051703 A1 | 7/2002 |
| WO | WO 2007/095522 A2 | 8/2007 |
| WO | WO 2007/110732 A2 | 10/2007 |

OTHER PUBLICATIONS

Amendment under Article 34 filed Dec. 28, 2010, in International Application No. PCT/US09/067107.

Hermanmiller, Embody Chair for Your Body and Mind Product data sheet off of Hermanmiller website, http://www.hermanmiller.com/CDA/SSA/Product/0,,a10-c440-p271,00.html Oct. 27, 2008.

* cited by examiner

SYNCHRONOUS SEAT RECLINE MECHANISM

CROSS-REFERENCE TO RELATED APPLICATIONS

This application claims priority to U.S. Provisional Patent Application, Ser. No. 61/565,113, filed Nov. 30, 2011, entitled Aircraft Seat, the entire contents of which is incorporated herein by reference in its entirety.

FIELD

The invention relates to an aircraft seat, and in particular, a synchronous recline mechanism for an aircraft seat.

BACKGROUND

Aircraft seats have specific performance requirements that generally relate to weight and crash loads, typically requiring low weight and high strength. These performance requirements are often significant drivers of seat design, especially in seats including integral occupant restraints.

The performance requirements are not always aligned with seat comfort. For instance, to attempt to accommodate occupant comfort, current aircraft seats are able to recline by changing the angle of the seat back. In such a traditional aircraft seat, as the seat back is reclined, increasing frictional force is required under the occupant's backside to keep the occupant from sliding out of the seat. This friction uncomfortably tugs on clothing, can lead to the occupant sliding forward, and may create a gap in the lumbar region of the back or spine. Moreover, current seats that incorporate back/bottom motion do not provide proper back motion relative to the seat bottom—in particular where width is restricted and an actual pivot point cannot be placed at the actual hip point of the seated occupant. Moreover, typical recline mechanisms for seat backs do not approximate recline about the hip point, resulting in either gaps that open up between the back and bottom, up/down shear motion relative to the occupant's back, or both. Further, relatively large recline angles in addition to the natural motion are not possible in current aircraft seating products even with traditional/simple recline geometries.

Another typical concern with aircraft seats, and specifically flight deck seats, is the ability of the pilot to fully extend his or her legs to fully actuate the rudder pedals of the aircraft. In current aircraft seats, this need is addressed through complicated mechanisms that "give-way" under load. These systems, unfortunately, are often poorly designed from an ergonomic perspective and are not well-understood by users, causing misuse and reduced comfort.

The foregoing concerns with traditional flight deck seating lead to back fatigue, discomfort, loss of concentration, and the possibility of injury.

SUMMARY

A seat for use in an aircraft having a floor is provided. The seat has a support assembly, a seat, a seat back pivotably coupled to the support assembly for movement between an upright position and a reclined position relative to the support assembly, and an occupant back support having an upper portion and lower portion pivotally coupled to the seat back at the upper portion. A pivot link pivotally couples to the rear portion of the seat at a first end and pivotally couples to the lower portion of the occupant back support at a second end. The pivot link causes the lower portion of the occupant back support to move downwardly and forward relative to the seat as the seat back moves from the upright position to the reclined position.

A seat as described herein provides a highly-structural, synchronous recline mechanism for an aircraft seat that supports the natural recline of the human body based on the human body's linkages. In particular, the seat back moves downward as it rotates, approximating the natural recline of the human body about the hip point.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

The attached Figures illustrate one or more examples of an aircraft seat 100 or flight deck seat and its operation. According to one or more examples of embodiments, the seat 100 described herein is for use in an aircraft having a floor. An example aircraft seat for use with the present invention is illustrated in co-owned U.S. Pat. No. 8,087,729, which is incorporated herein by reference in its entirety. While specific examples are provided, the principles set forth herein may be used in other applications or aircraft seats.

Figure 1:
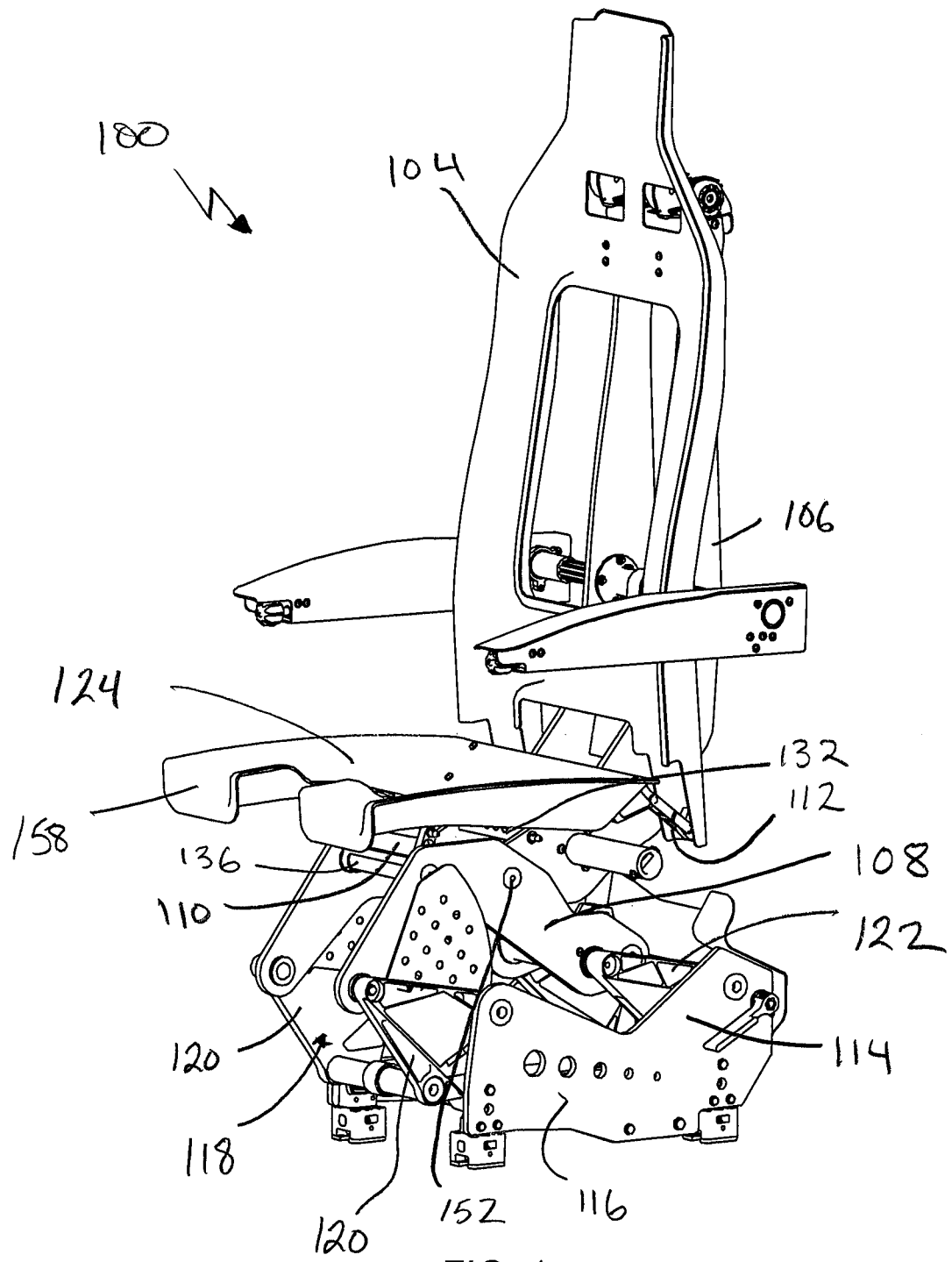
FIG. 1 is a perspective view of one or more examples of embodiments of a seat as detailed herein.

The seat 100 described herein includes several elements that can be mounted to a variety of base structures (see FIG. 1). The base structure elements described in further detail herein include a seat bottom frame 102, a seat back frame 104, a seat back beam 106, a mid-support beam 108, a bottom frame link 110, and a bottom-back frame link 112.

Figure 2:
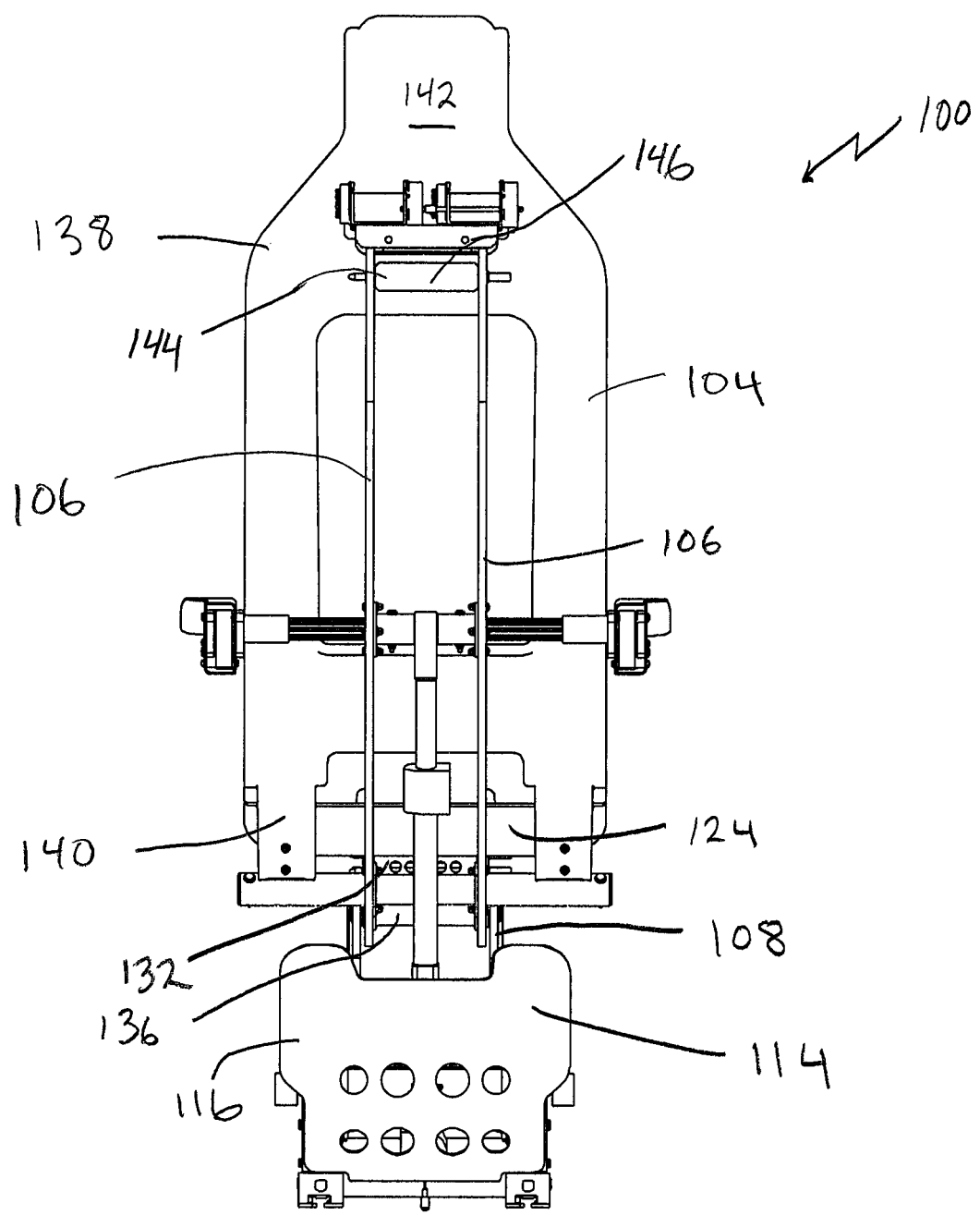
FIG. 2 is a rear elevation view of the seat shown in FIG. 1, taken from line 2-2 of FIG. 1.
Figure 3:
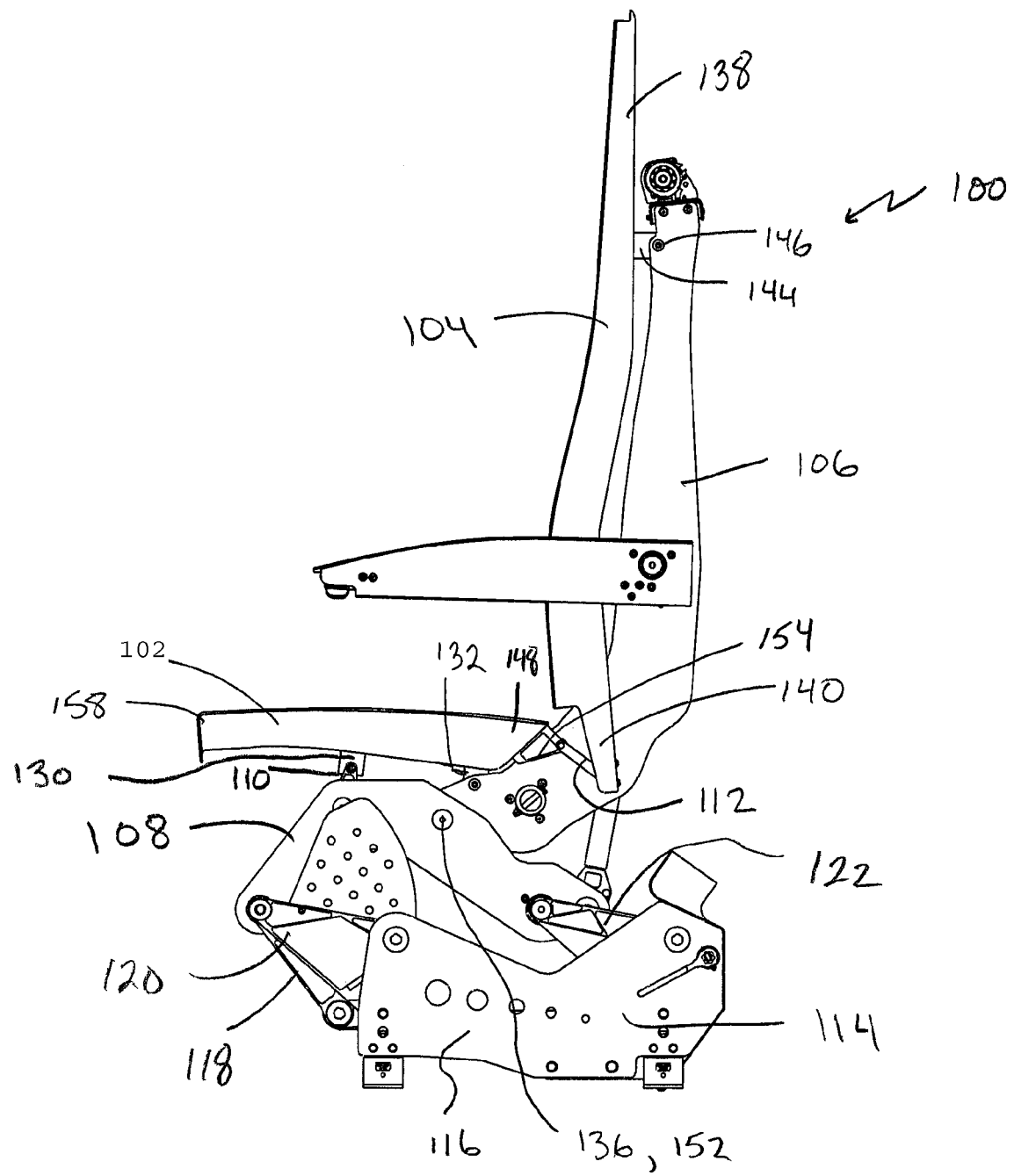
FIG. 3 is a side elevation view of the seat shown in FIG. 1, taken from line 3-3 of FIG. 1.

Referring to FIGS. 1-3, the base structure may include a support assembly 114. The support assembly 114 is adapted to be secured to a floor. In one or more examples of embodiments, the support assembly 114 is or includes a durable rigid frame or bottom frame 116 formed of one or more stiff composite or metallic elements. The bottom frame 116 may include one or more structures to couple, or movably couple the seat 100 to the floor, or otherwise support the seat on the floor.

As can be seen in FIGS. 1-3, a mid-support beam 108 is coupled to the support assembly 114. The mid-support beam element 108 is coupled to the support assembly 114 by a pair of pivot assemblies discussed in further detail hereinbelow. The mid-support beam element 108 includes or is defined by one or more durable stiff or rigid composite or metallic beams, which may be interconnected. The mid-support beam 108 incorporates pivot points, discussed in further detail hereinbelow, for a bottom frame link 110 and a seat back beam 106. The mid-support beam 108 enables the seat back 104 and bottom frame 116 to be mounted directly to the floor of the aircraft or to a vertical adjustment mechanism 118, enabling the seat back frame 104 and bottom frame 116 to move up and down. In the illustrated example, a vertical adjustment mechanism 118 is provided which includes forward and rear pivot arms or assemblies which couple to the bottom frame 116 at a lower pivot point and couple to the mid-support beam 108 by an upper pivot point. As can be seen in FIG. 1, the forward and rear pivot arms 120, 122 are each formed of a pair of interconnected pivot arms. The vertical adjustment assembly may be coupled to a suitable control assembly for controlling the movement of the vertical adjustment assembly 118, to move the seat vertically between lower and upper extremes.

Figure 8:
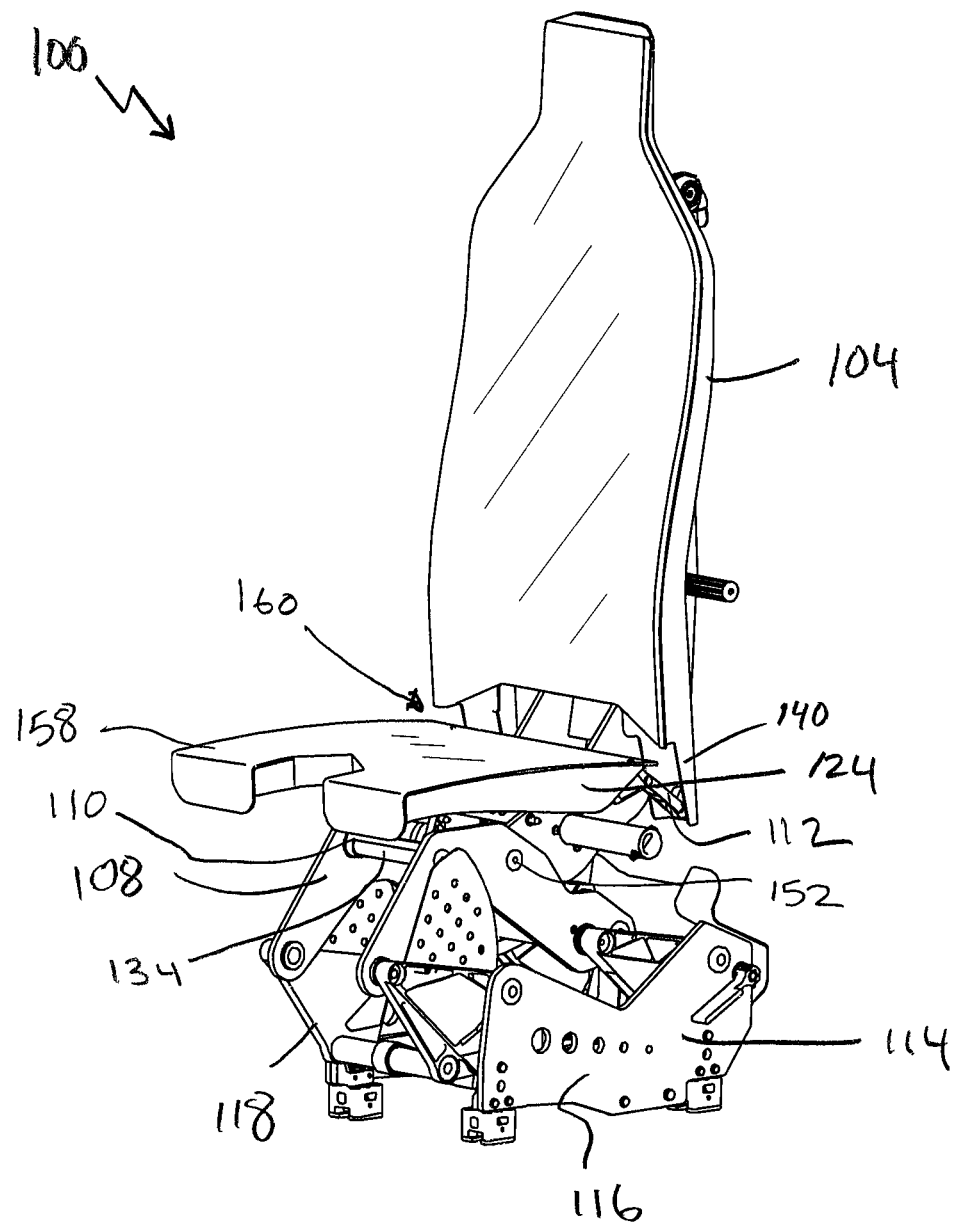
FIG. 8 is a perspective view of the seat shown in FIG. 1, having a seat bottom seating surface and back seating surface thereon.

A seat, or seat bottom 124, is carried or supported by the support structure 114 and/or mid-support beam element 108. The seat, and more specifically seat bottom 124, is defined by or includes a seat bottom frame element 102. The seat bottom frame element 102 is arranged and sized to support an occupant. In the illustrated example, the seat bottom frame 102 is defined by a stiff composite shell roughly sized to support a seated occupant's bottom. In the alternative, one or more interconnected frame members may make up the seat bottom frame element 102. The seat bottom frame 102 supports or carries a seating surface, such as for example, an elastomeric seating surface or a foam cushion (see FIG. 8). In this regard, the seat bottom frame element 102 provides a compliant support for the seated occupant's bottom.

Figure 6A:
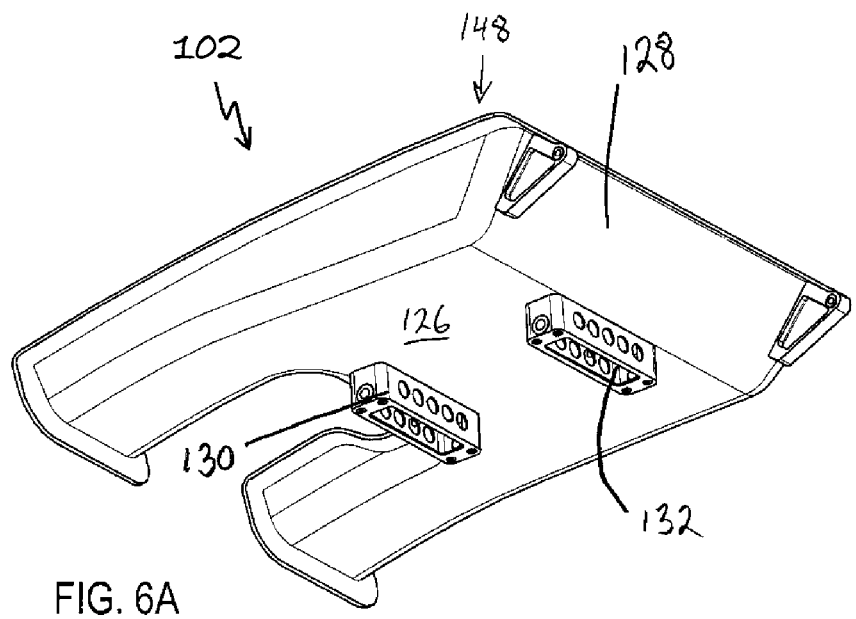
FIG. 6A is a perspective view of one or more examples of embodiments of a seat bottom frame for use with a seat as shown in FIG. 1, showing one or more examples of link or pivot attachment mechanisms thereon.

The seat bottom frame element 102 incorporates pivot points for connection with the bottom frame link 110, the seat back beam 106, and the bottom-back frame link 112. To this end, as shown in FIG. 6A, the seat bottom frame element 102 may include a mounting surface 126 for mounting one or more pivot link connection elements. The seat bottom frame 102 may also include a rear flange 128 providing mounting locations for a back support link, as well as lateral bending stiffness in one or more examples of embodiments.

Figure 6B:
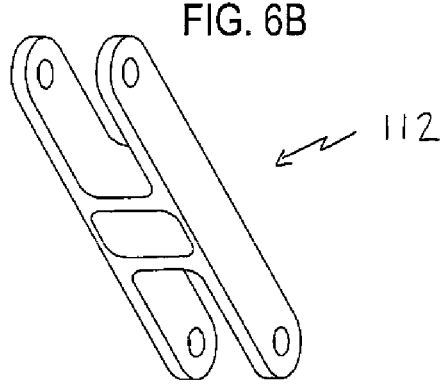
FIG. 6B is a perspective view of one or more examples of embodiments of a bottom-back link as described herein for use with the seat shown in FIG. 1.
Figure 6C:
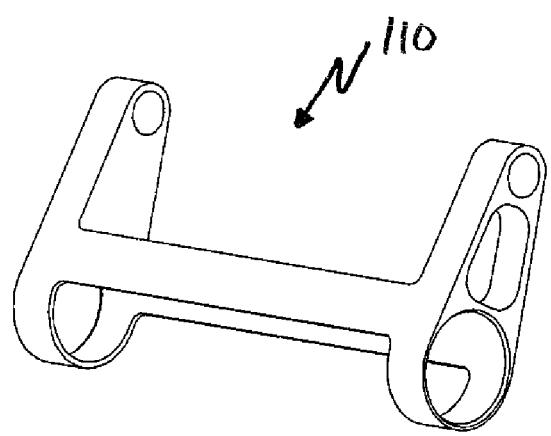
FIG. 6C is a perspective view of one or more examples of embodiments of a bottom frame link as described herein for use with the seat shown in FIG. 1.

A bottom frame link 110 is provided which includes or is defined by one or more elements that connect the seat bottom frame 102 to the mid-support beam 108 (FIG. 6C). The bottom frame link 110 can be made from a variety of structural materials, or durable rigid or stiff materials, including for example metallic and/or composite materials. As can be seen in FIG. 6A, the seat bottom frame 102, on a lower surface, carries a seat bottom frame to bottom frame link connection element 130, providing a pivot and connection point. The seat bottom frame 102 on the lower surface also carries a seat bottom frame to seat back beam link connection element 132, providing a pivot or connection point.

A mid-support pivot point to bottom frame link connection element 134 is provided on the mid-support beam element 108. The bottom frame link 110 connects or couples the seat bottom frame 102 to the mid-support beam 108 by pivotal connection with the mid-support pivot point to bottom frame link connection element 134 and the seat bottom frame to bottom frame link connection element 130. In the alternative, the corresponding pivot points are directly connected.

Similarly, a mid-support pivot point to seat back beam connection element 136 is provided on the mid-support beam element 108. The mid-support pivot point to seat back beam connection element 136 may be directly, pivotably, connected to the seat bottom frame to seat back beam connection element 132, or in the alternative may be pivotably connected through a link.

Figures 4, 5:
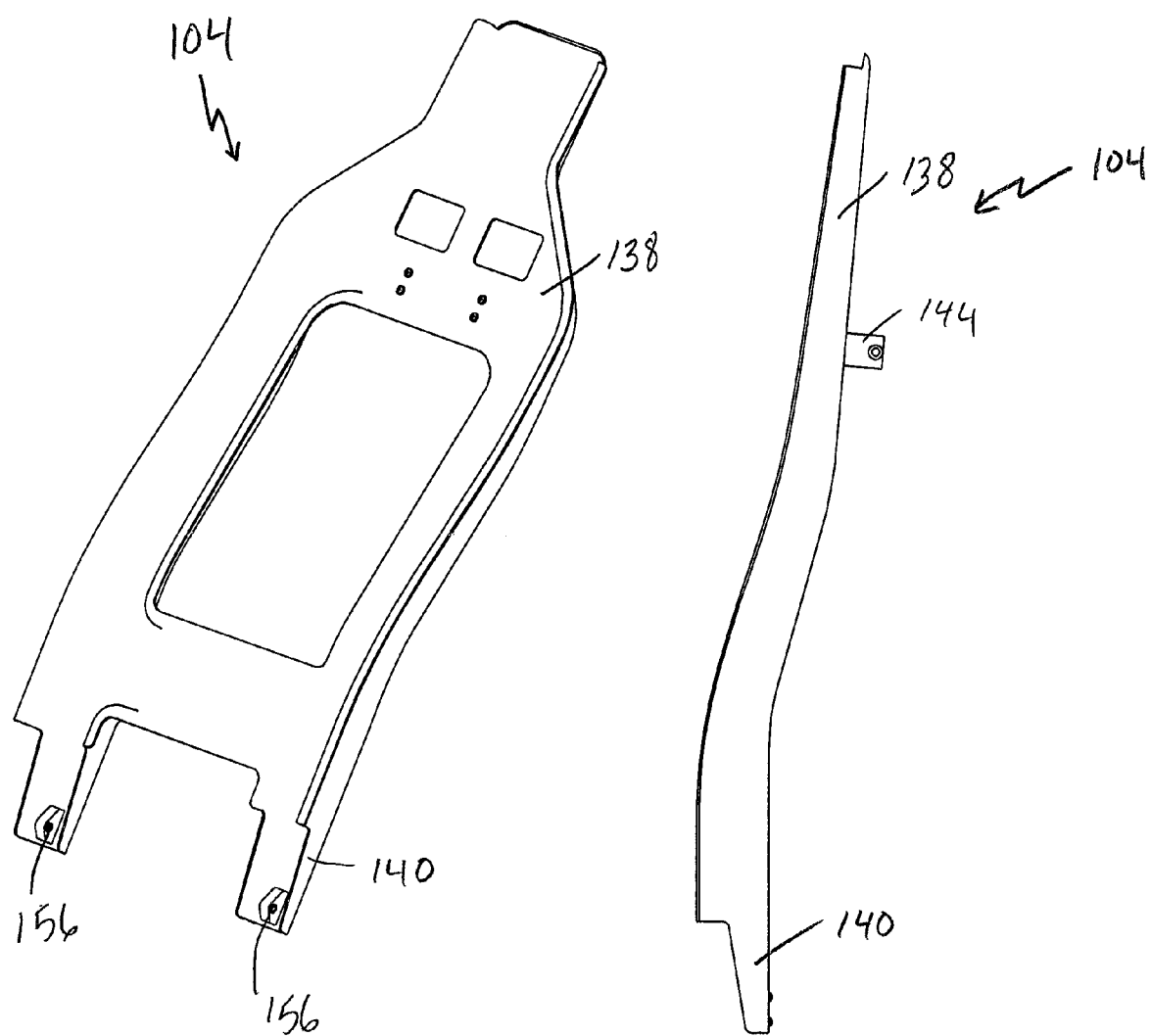
FIG. 4 is a perspective view of one or more examples of embodiments of a seat back frame for use with a seat as shown in FIG. 1.
FIG. 5 is a side elevation view of one or more examples of embodiments of a seat back frame for use with a seat as shown in FIG. 1, taken from line 5-5 of FIG. 4.

A seat back or seat back frame 104 is also provided (see FIGS. 4-5). The seat back frame 104 is pivotably coupled to the support assembly 114 for movement between an upright position and a reclined position relative to the support assembly. The seat back 104 includes or is defined by an occupant back support and/or seat back frame element 104 and a seat back beam 106 (see FIGS. 2-3).

The seat back frame element 104 is arranged and sized to support an occupant's back. In the illustrated examples of embodiments, the support includes or is defined by a durable stiff composite shell roughly sized to a seated occupant's back, or in the alternative one or more interconnected frame members. However, variations thereon may be acceptable for the purposes provided. The support may carry an occupant support surface, such as for example an elastomeric surface or a cushion (see FIG. 8). The seat back frame element provides a compliant support for the seated occupant's back.

Figure 7:
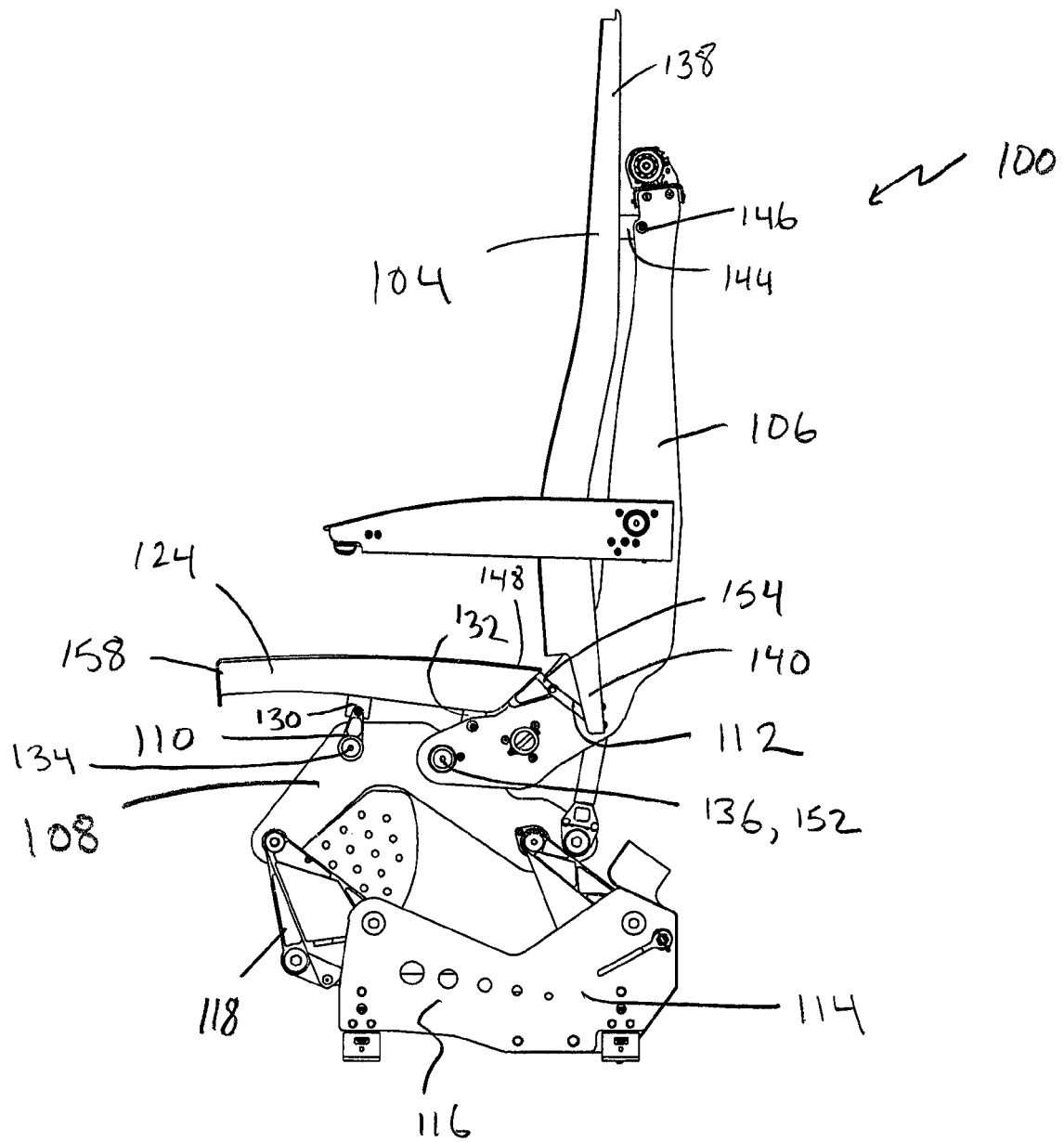
FIG. 7 is a cut away side elevation view of the seat shown in FIG. 1, showing the various link and pivot assemblies described herein.

Referring to FIG. 7, the seat back frame element 104 has an upper portion 138 and a lower portion 140. In particular, the seat back frame element 104 incorporates upper and lower pivot points, as discussed in further detail herein, for connection with the seat back beam 106 and a bottom-back frame link 112.

In the illustrated example, the seat back beam 106 is pivotably coupled to the occupant back support 104 at the upper portion 138. To this end, a rear surface 142 of the seat back frame 104 carries a seat back frame to seat back beam link connection element 144, which forms a pivot point connection between the seat back frame 104 and the seat back beam 106. The seat back beam element 106 carries a seat back frame to seat back beam pivot connection element 146 on the seat back beam, providing a pivot point. The connection elements may be coupled together by a pivot arm which aligns with and is pivotally secured to the connection elements on both ends of the pivot arm. In the alternative, the connection elements may be directly pivotally coupled, such as by a male-female pivot link. The various elements and links may be coupled by a pivot pin or the like.

The seat back beam element 106 includes or is defined by one or more durable stiff or rigid composite or metallic beams (see FIG. 2). The seat back beam element 106 is positioned and extends or runs behind the seat back frame 104 or occupant support for the entire height of the seat back frame 104 and extends forward under a rear portion 148 of the seat bottom frame 102 (FIG. 7).

The seat back beam element 106 incorporates pivot points for the seat back frame element 104 and seat bottom frame element 102. A pivot point for the seat back frame 104 is toward the upper end of the seat back beam 106. A pivot point for the seat bottom frame 102 is close to the seat back beam 106 pivot joint 152 with the mid-support beam 108. To this end, the seat back beam element 106 provides pivot points for the seat back frame 104 and bottom frame 116, and is arranged to react to seat back structural loads. The seat back beam element also incorporates a variety of mounting holes 150 for other seat 100 components such as shoulder and lap belt restraints, armrests, and a headrest. The seat back beam element 106 is also coupled by a pivot mechanism 152 to the mid-support beam element 108, and pivots about a lateral axis on the mid-support beam element. In one or more examples of embodiment, seat back beam motion may be controlled by a locking element between the seat back beam and the mid-support beam 108.

A bottom-back frame link 112, as shown in FIG. 6B, is provided which includes or is defined by one or more elements that connect the seat bottom frame 102 to the seat back frame 104. The bottom-back frame link 112 can be made from a variety of structural materials, or rigid or stiff durable materials, including for example metallic and/or composite materials. As can be seen in FIG. 7, the seat bottom frame 102 on a lower surface 102 and/or rear surface 128 carries a seat bottom frame to bottom-back link connection element 154, providing a pivot or connection point. In one example, two seat bottom frame to bottom-back link connection elements 154 are provided in a spaced apart relation near lateral edges of the seat bottom frame 102. In addition, the seat back frame 104 carries a seat back frame to bottom-back frame link connection element 156. In one example, two seat back frame to bottom-back link connection elements 156 are provided. The connection elements may be coupled together by a pivot arm, such as a bottom-back frame link 112, which aligns with and is pivotally secured to the connection elements on both ends of the pivot arm. In the alternative the connection elements may be directly pivotably coupled.

Accordingly, a pivot link is provided pivotably coupled to the rear portion of the seat at a first end and pivotably coupled to the lower portion of the occupant back support at a second end. In this arrangement, the lower portion of the occupant back support is caused to move downwardly and forward relative to the seat as the seat back moves from an upright position to a reclined position.

The various elements and links described herein as being coupled, may be coupled by any suitable mechanism, one example of which is a pivot pin or the like.

A recline adjustment assembly may also be provided for controlling the recline of the seat back between two extreme positions, namely full recline and upright or no recline. The recline adjustment assembly is capable of controlling the recline angle of the seat back, and may be coupled to the seat back beam and/or the mid-support beam, as well as the support assembly. The recline assembly may be connected to a control for controlling recline of the seat back.

In one or more alternative examples of embodiments, a seat angle adjustment mechanism may also be provided. For example, an adjustment mechanism may be provided for adjusting a seated occupant thigh angle. In one or more examples of embodiments, an angle adjustment assembly may be mounted such that it connects or is coupled to the seat bottom frame and/or the mid-support beam, and/or the support assembly. The angle adjustment assembly is adapted to vary the position of the seat bottom frame relative to the support assembly and/or mid-support beam, and is thereby capable of changing the angle of the seat bottom frame and supported seat.

Accordingly, a seat 100 for use in an aircraft having a floor is provided. The aircraft seat has a support assembly adapted to be secured to the floor, a seat, a seat back pivotably coupled to the support assembly for movement between an upright position and a reclined position relative to the support assembly, and an occupant back support having an upper portion and lower portion pivotally coupled to the seat back at the upper portion, a pivot link pivotably coupled to the rear portion of the seat at a first end and pivotably coupled to the lower portion of the occupant back support at a second end for causing the lower portion of the occupant back support to move downwardly and forward relative to the seat as the seat back moves from the upright position to the reclined position.

One or more examples of the operation of the seat 100 described herein will now be described in reference to the Figures.

Figure 9:
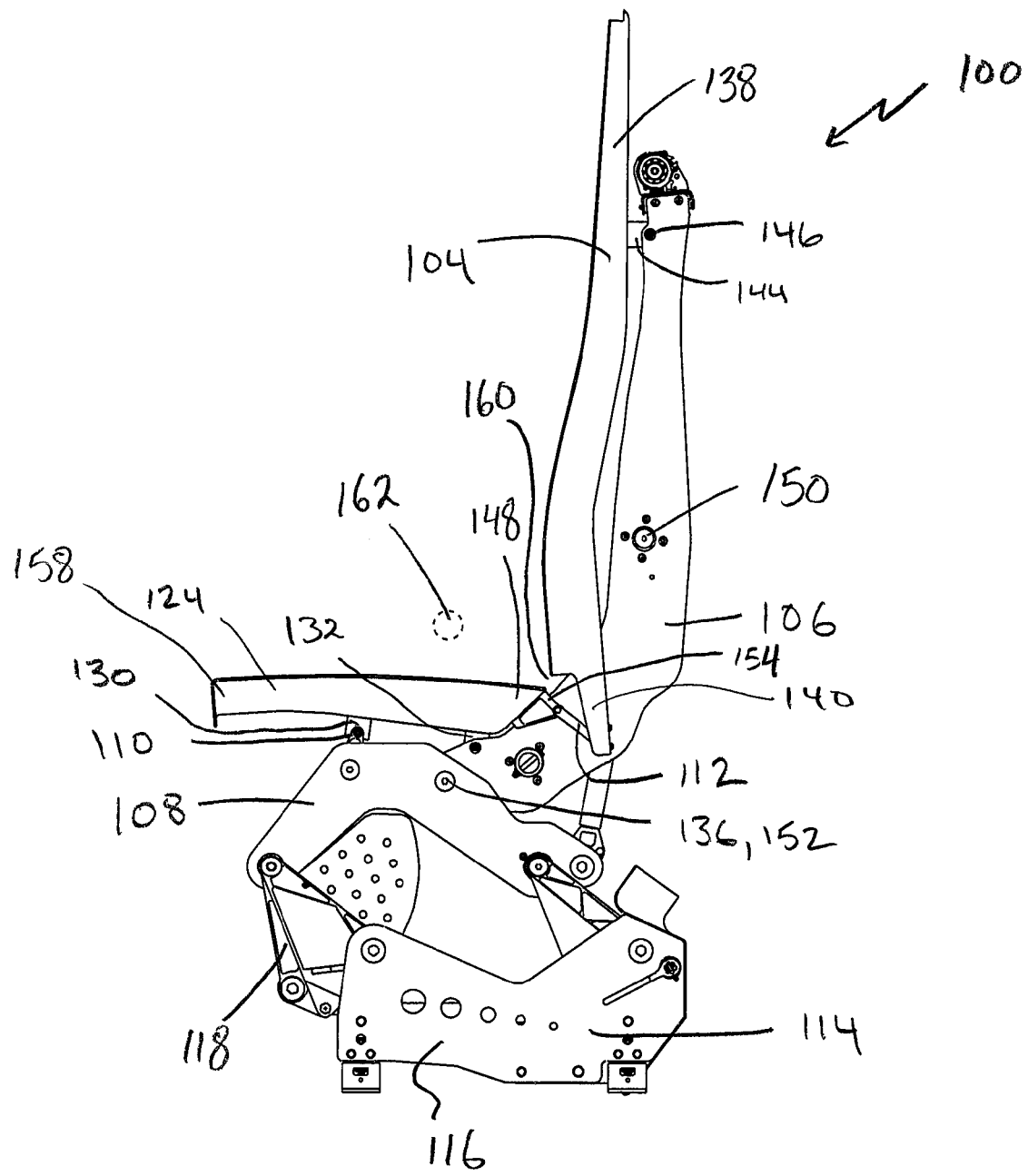
FIG. 9 is a side elevation view of the seat shown in FIG. 1, showing a seated occupant hip pivot point in relation to the seat.
Figures 10A, 10B:
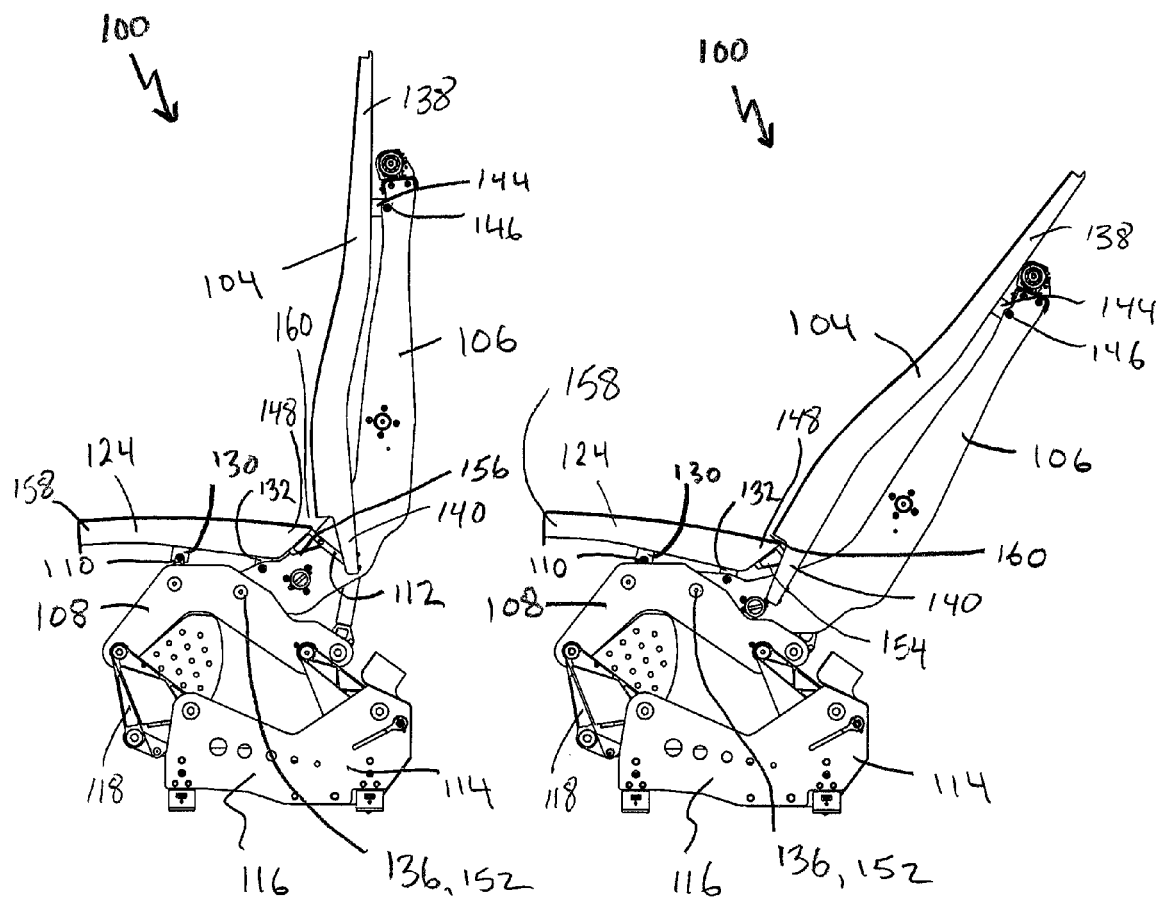
FIG. 10A is a side elevation view of the seat shown in FIG. 1, showing the seat in a maximum upright or no recline position.
FIG. 10B is a side elevation view of the seat shown in FIG. 1, showing the seat in a maximum recline position.
Figure 11:
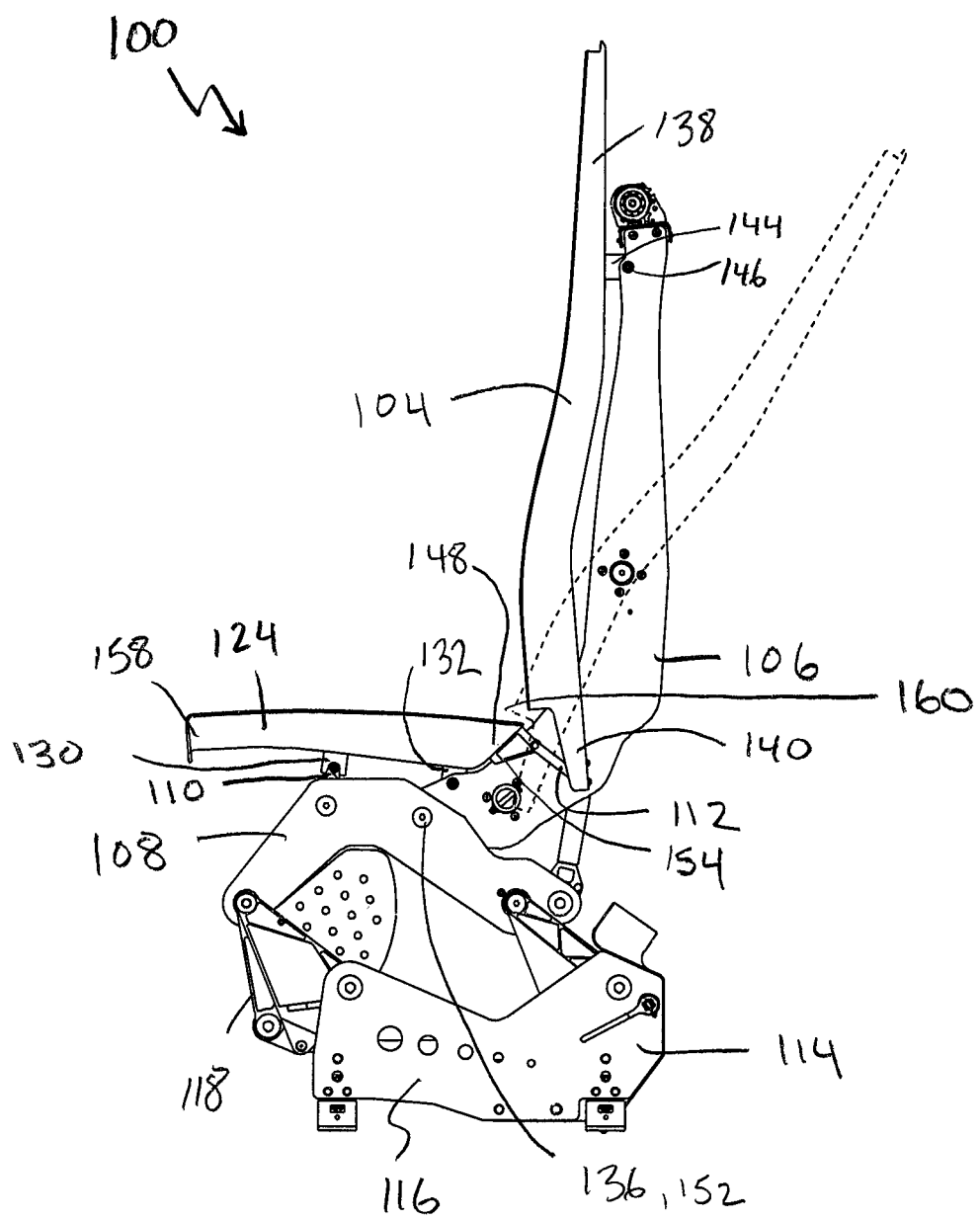
FIG. 11 is a side elevation view of the seat shown in FIG. 1, showing the recline of the seat back in dashed lines.

Referring to FIGS. 9-11, according to one or more examples of embodiments, the seat 100 described herein includes various linkages which form a synchronous recline mechanism to enable the seat bottom 124 and seat back 104 to move in motions that mirror the natural motion of the human body. To this end, in order to provide the proper motion of the seat bottom frame 102, the seat bottom frame 102 pivots and translates in space roughly about the ankle of the seated occupant. This motion enables a natural recline motion that increases the seat bottom frame 102 angle during recline to cradle the occupant and reduce friction under the thighs and bottom of the occupant.

To allow the above-described motion, the seat bottom frame 102 is connected to the mid-support 108 via the bottom frame link 110 and the seat back beam 106 via a pivot joint 152, enabling a four-bar-type motion and allowing rotation and translation. As can be seen by reference to FIG. 7, the bottom frame link 110 connects or couples to the seat bottom frame 102 roughly in the middle of the seat bottom frame. The pivot point 152 with the seat back beam is toward the rear of the seat bottom frame 102. The position of the pivot points on the mid-support beam 108, seat bottom frame 102, and seat back beam 106 result in a seat bottom frame motion that pivots roughly about the ankle point of the seated occupant.

During recline, the seat back beam 106 (which is unlocked) is allowed to pivot aft. This motion moves the rear pivot point 152 with the seat bottom frame 102 and causes the seat bottom frame 102 to be drawn aft and downward. The motion of the front 158 of the seat bottom frame 102 is controlled by bottom frame link 110. The front edge 158 of the seat bottom frame 102 moves downward as it rotates so that pressure is maintained under the thighs of the occupant.

To provide the proper/ideal motion of the seat back frame 104, the seat back frame 104 pivoted in space roughly about the hip point 162 (shown in FIG. 9) of the seated occupant. In this regard, the gap 160 between the seat bottom frame 102 and the seat back frame 104 is reduced during recline with the bottom edge of the seat back frame moving forward and down relative to the rear portion of the seat bottom frame. Since a mechanical joint cannot be placed at the actual hip point of the seated occupant, to achieve the motion, as described above the seat 100 allows the seat back to pivot and translate forward and downward around its bottom edge approximating the proper ideal motion. This motion is achieved through the placement of the pivot points on the seat back frame 104, seat back beam 106, seat bottom frame 102, as well as the bottom-back frame link 112. During recline, the seat back beam 106 (which is unlocked) is allowed to pivot with the mid-support beam 108. This motion causes the seat back frame 104 to be drawn aft via the upper pivot connection between the seat back beam and seat back frame, increasing recline angle of both elements. The motion of the bottom of the seat back frame 104 is then controlled by its connection to the seat bottom frame 102 via the bottom-back frame link 112. This link causes the seat back to move downward as it pivots while reducing the gap 160 between the seat back frame 104 and seat bottom frame 102. This motion approximates the natural recline of the human body about the hip point 162.

Various advantages are provided by the seat 100 described and illustrated herein. For example, the seat creates virtual pivot points in space through the use of mechanisms that are behind/below the occupant. This enables the described synchronous motion to be incorporated into the narrow space constraints of an aircraft seat. By comparison, other seats that incorporate synchronous back/bottom motion do not provide proper back motion relative to the seat bottom—in particular where width is restricted and an actual pivot point cannot be placed at the actual hip point of the seated occupant. Additionally, contrary to typical recline mechanisms for seat backs, the seat described herein approximates recline about the hip point of a seated occupant, avoiding or reducing gaps that open up between the back and bottom, as well as the up/down shear motion relative to the occupant's back. In addition, the mechanism of the seat described herein enables relatively large recline angles, in addition to the natural motion, which are not possible in current aircraft seating products. Additionally, the mechanism is capable of reacting to substantial structural loads encountered in aircraft seat testing.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:

1. An aircraft seat for use in an aircraft having a floor comprising a support assembly coupleable to an aircraft floor, a seat bottom having a seat bottom frame pivotably coupled to the support assembly, a seat back beam supporting a seat back frame, the seat back beam pivotably coupled to the support assembly, wherein the seat back frame defines an occupant back support having:
   an upper portion and lower portion pivotally coupled by a non-translational pivot connection to the seat back beam at the upper portion; and
   a pivot link pivotally coupled to a rear portion of the seat bottom frame at a first end and pivotally coupled to the lower portion of the occupant back support at a second end;
   such that the lower portion of the occupant back support moves downwardly and forward relative to the seat bottom frame and the seat bottom frame is drawn toward the seat back frame and tilts downward as the seat back frame moves from an upright position to a reclined position.

2. The aircraft seat of claim 1, wherein the support assembly includes a mid-support beam element.

3. The aircraft seat of claim 2, wherein a bottom frame link pivotably couples the seat bottom frame to the mid-support beam element.

4. The aircraft seat of claim 1, wherein the seat bottom frame is pivotably coupled to a lower portion of the seat back beam.

5. The aircraft seat of claim 1, further comprising a vertical adjustment assembly for movement of the seat bottom frame and the seat back beam between an upper position and a lower position.

6. The aircraft seat of claim 1, further comprising a recline adjustment assembly for movement of the seat back frame and seat bottom frame between the upright position and the reclined position.

7. The aircraft seat of claim 1, further comprising a seat angle adjustment assembly for adjustment of the angle of the seat bottom frame relative to the support assembly.

8. A aircraft seat for use in an aircraft, comprising a support assembly coupleable to an aircraft floor having a mid-support beam element, a seat having a seat bottom frame, a seat back including a seat back beam pivotably coupled to the support assembly which is horizontally and rotationally moveable and moveable between an upright position and a reclined position relative to the support assembly, an occupant back support having an upper portion and lower portion pivotally coupled by a non-translational pivot connection to the seat back beam at the upper portion, and a pivot link pivotally coupled to a rear portion of the seat bottom frame at a first end and pivotally coupled to the lower portion of the occupant back support at a second end, such that:
   the lower portion of the occupant back support moves downwardly and forward relative to the seat bottom and the seat bottom frame tilts back and moves toward the seat back as the seat back moves from the upright position to the reclined position; and
   a front edge of the seat bottom frame moves downward as the aircraft seat horizontally rotates.

9. The aircraft seat of claim 8, wherein a bottom frame link pivotably couples the seat bottom frame to the mid-support beam element.

10. The aircraft seat of claim 8, wherein the seat bottom frame is pivotably coupled to a lower portion of the seat back beam.

11. The aircraft seat of claim 8, further comprising a vertical adjustment assembly for movement of the seat bottom frame and the seat back beam between an upper position and a lower position.

12. The aircraft seat of claim 8, further comprising a recline adjustment assembly for movement of the seat back and seat bottom frame between the upright position and the recline position.

13. The aircraft seat of claim 8, further comprising a seat angle adjustment assembly for adjustment of the angle of the seat bottom frame relative to the support assembly.

14. The aircraft seat of claim 8, wherein the mid-support beam, seat bottom frame, and seat back frame have pivot points allowing for rotational movement of the seat bottom frame about a point in space located approximately below a front edge of the seat bottom frame.

15. An aircraft seat for use in an aircraft comprising:
   a support assembly coupleable to an aircraft floor having a mid-support beam element;
   a seat bottom having a seat bottom frame and a bottom frame link pivotably coupling the seat bottom frame to the mid-support beam element;
   a seat back having a seat back beam pivotably coupled to the support assembly for movement between an upright position and a reclined position relative to the support assembly, a pivotal connection between the seat bottom and the seat back, and an occupant back support having an upper portion and a lower portion pivotally coupled by non-translational pivot connection to the seat back beam at the upper portion; and
   a pivot link pivotably coupled to a rear portion of the seat bottom at a first end and pivotally coupled to the lower portion of the occupant back support at a second end for causing the lower portion of the occupant back support to move downwardly and forward relative to the seat bottom as the seat back moves from the upright position to the reclined position.

16. The aircraft seat of claim 15, further comprising a vertical adjustment assembly for movement of the seat bottom frame and the seat back beam between an upper position and a lower position.

17. The aircraft seat of claim 16, wherein the support assembly includes a support assembly bottom frame coupled to the vertical adjustment assembly.

18. The aircraft seat of claim 15, further comprising a recline adjustment assembly for the movement of the seat back and seat bottom frame between the upright position and the recline position.

19. The aircraft seat of claim 15, wherein the seat bottom frame is pivotably coupled to a lower portion of the seat back beam.

20. The aircraft seat of claim 15, wherein a bottom frame link pivotably couples the seat bottom frame to the mid-support beam element.

* * * * *